United States Patent
Budinski et al.

(10) Patent No.: US 6,305,194 B1
(45) Date of Patent: Oct. 23, 2001

(54) MOLD AND COMPRESSION MOLDING METHOD FOR MICROLENS ARRAYS

(75) Inventors: Michael K. Budinski, Pittsford; Jayson J. Nelson, Webster; Phillip D. Bourdage, Penfield; David A. Richards; Paul O. McLaughlin, both of Rochester; Paul D. Ludington, Brockport, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/354,219

(22) Filed: Jul. 15, 1999

(51) Int. Cl.[7] .................................................. C03B 23/02
(52) U.S. Cl. .............................. 65/105; 65/102; 264/1.1; 264/2.5; 425/357
(58) Field of Search .................................. 65/63, 64, 102, 65/105, 275, 286, 292, 304, 323; 264/1.1, 2.5; 425/112, 116, 121, 357

(56) References Cited

U.S. PATENT DOCUMENTS

| | | |
|---|---|---|
| 3,833,347 | 9/1974 | Angle et al. . |
| 4,139,677 | 2/1979 | Blair et al. . |
| 4,168,961 | 9/1979 | Blair . |
| 4,243,618 | 1/1981 | Van Arnam . |
| 4,738,703 | 4/1988 | Izumitani et al. . |
| 4,797,144 | 1/1989 | DeMeritt et al. . |
| 5,276,538 | 1/1994 | Monji et al. . |
| 5,298,366 | 3/1994 | Iwasaki et al. . |
| 5,300,263 | 4/1994 | Hoopman et al. . |
| 5,507,806 | 4/1996 | Blake . |
| 5,536,455 | 7/1996 | Aoyama et al. . |
| 5,623,368 | 4/1997 | Calderini et al. . |
| 5,662,951 | 9/1997 | Greshes . |

Primary Examiner—Sean Vincent
(74) Attorney, Agent, or Firm—Mark G. Bocchetti

(57) ABSTRACT

A method and apparatus is disclosed for compression molding arrays optical elements which may be later singulated. The apparatus includes first and second mold halves with the second mold half having a central nest and a plurality of predetermined negative optical surface features therein. A glass preform is placed in the central nest and the first and second mold halves and the glass preform are heated to at least the glass transition temperature of the glass preform. The glass preform is then pressed between the first and second mold halves to thereby form an integral array of optical elements with each of the optical elements being a positive of the predetermined negative optical surface features. The integrally formed array of optical elements is then cooled to below the glass transition temperature and removed from the first and second mold halves.

14 Claims, 4 Drawing Sheets

MOLD AND COMPRESSION MOLDING METHOD FOR MICROLENS ARRAYS

FIELD OF THE INVENTION

This invention relates generally to the compression molding of glass lenses and, more particularly, to methods and apparatus for molding arrays of lenses and microlenses.

BACKGROUND OF THE INVENTION

Various methods and apparatus for the compression molding of glass optical elements are known in the prior art. With these methods and apparatus, optical element preforms sometimes referred to as gobs are compression molded at high temperatures to form glass lens elements. The basic process and apparatus for molding glass elements is taught in a series of patents assigned to Eastman Kodak Company. Such patents are U.S. Pat. No. 3,833,347 to Engle et al, U.S. Pat. No. 4,139,677 to Blair et al, and U.S. Pat. No. 4,168,961 to Blair. These patents disclose a variety of suitable materials for construction of mold inserts used to form the optical surfaces in the molded optical glass elements. Those suitable materials for the construction of the mold inserts included glasslike or vitreous carbon, silicon carbide, silicon nitride, and a mixture of silicon carbide and carbon. In the practice of the process described in such patents, a glass preform or gob is inserted into a mold cavity with the mold being formed out of one of the above mentioned materials. The molds reside within a chamber in which is maintained a non-oxidizing atmosphere during the molding process. The preform is then heat softened by increasing the temperature of the mold to thereby bring the viscosity of the preform into the range from about $10^{10}$ P to about $10^6$ P. Pressure is then applied to force the preform to conform to the shape of the mold cavity. The mold and preform are then allowed to cool below the glass transition temperature of the glass. The pressure on the mold is then relieved and the temperature is lowered further so that the finished molded lens can be removed from the mold.

With regard to the compression molding of near-net-shape glass optical elements it is well known that a glass preform with a precision polished surface must be pressed between the upper and lower halves of a mold. If a double positive lens (convex-convex lens) is to be molded, for example, a spherical or oblate spheroid glass preform of the proper volume is placed between the mold halves, heated until the glass has a viscosity in the range of $10^6$–$10^{10}$ Poise, and is compressed until the mold is closed then preferably cooled to a temperature below the annealing point and demolded. In such an arrangement, as shown in FIG. 1, the upper and lower mold halves 10, 12 compress a spherical glass preform 14 therebetween. The radius of the spherical glass preform 14 must be less than the radius of both of the concave mold surfaces 16, 18. As the glass preform 14 is compressed, the glass flows generally radially outwardly from the center of the mold cavity thereby expelling any gas from the mold cavity. This results in the production of a double convex lens 20 free from distortion due to trapped gas. Such molded lenses typically have accurate and repeatable surface replication relative to the mold.

Depending on the final shape of the lens to be formed, specially shaped preforms are sometimes required to ensure that the glass flows from the center of the mold cavity to the edge as shown in FIGS. 2–4. FIG. 2 schematically depicts a prior art arrangement wherein the upper mold half 22 includes a plano mold surface 24 and the lower mold half 26 includes a concave mold surface 28. In such an arrangement, a spherical preform 30 just as with the arrangement depicted in FIG. 1, but in this instance to produce a piano-convex optical element 32. However, looking at FIG. 3 there is schematically depicted a prior art arrangement wherein the upper mold half 34 includes a convex mold surface 36 and the lower mold half 38 includes a concave mold surface 40. In such an arrangement, it is preferred to use a plano-convex preform 42 to produce a concave-convex optical element 44. The radius of the convex surface of preform 42 must be less than the radius of concave mold surface 40. This ensures first contact between mold surface 40 and preform 42 substantially at the centerline of the mold apparatus thereby causing the preform to flow generally radially outwardly to prevent the trapping of gases. Similarly, the first contact between convex mold surface 36 and the piano surface of preform 42 is substantially at the centerline of the mold apparatus thereby also causing the preform 42 to flow generally radially outwardly to prevent the trapping of gases. FIG. 4 schematically depicts a prior art arrangement wherein the upper mold half 46 includes a convex mold surface 48 and the lower mold half 50 includes a convex mold surface 52. In such an arrangement, it is preferred to use a plano-plano preform 54 to produce a double concave optical element 56. The plano-plano preform 54 ensures first contact between the mold surfaces 48, 52 and preform 54 substantially at the centerline of the mold apparatus thereby causing the preform to flow generally radially outwardly to prevent the trapping of gases. Examples of such practices are cited in U.S. Pat. Nos. 5,662,951 and 4,797,144. The method outlined in these patents works well for single cavity molds where one lens is molded from one preform. When molding an array of lenses or microlenses from one preform, the above approach will trap gas causing surface distortion of the lenses. U.S. Pat. No. 5,276,538 indicates that an array of microlenses may be fabricated by pressing a plano preform between an upper plano mold surface and a lower mold surface with concave microlens cavities. This approach, however, will cause surface figure distortion of the microlens features due to trapped gas. Another method of forming an array of microlens is taught in U.S. Pat. No. 5,276,538 where micro-sized spherical preforms are placed in a plurality of cavities of the lower mold and many microlenses are molded simultaneously. However, due to the expensive fabrication costs of the spherical performs and the production time required to place many microspheres onto a mold, this method would be cost prohibitive.

SUMMARY OF THE INVENTION

It is, therefore, the object of the present invention to provide a method and apparatus for compression molding an array of integrally formed glass lenses using a single preform.

It is a further object of the present invention to provide a method and apparatus for compression molding an array of integrally formed glass lenses which obviates surface figure distortion of the lenses in the array.

Briefly stated, the foregoing and numerous other features, objects and advantages of the present invention will become readily apparent upon a reading of the detailed description, claims and drawing set forth herein. These features, objects and advantages are accomplished by fabricating a first mold half; fabricating a second mold half with a central nest and a plurality of predetermined negative optical surface features therein; placing a glass preform in the central nest; heating the first and second mold halves and the glass preform to at least the glass transition temperature of the glass preform; pressing the glass preform between the first and second mold halves to thereby form an integral array of optical elements, each of the optical elements being a positive of the predetermined negative optical surface features; cooling the integral array of optical elements to below the glass transition temperature; and removing the integral array of optical elements from the first and second mold halves. The apparatus used for performing the method of the present invention comprises an upper mold half that is either piano or has microlens features; a lower mold half with microlens cavities and a central nest or depression for holding and aligning a cylindrical, spherical or oblate spheroid glass preform; and a means for heating the upper and lower mold halves and the preform. In the practice of the present invention it is important to prevent the formation of bubbles in the microlens features caused by failing to have the flowing glass preform expel all of the gas from each microlens cavity as the glass preform is compressed between the mold halves. Force, viscosity and rate of compression should be controlled to ensure that the glass flows smoothly into the microlens cavities. In addition, the depth, spacing, diameter, radial distance from the central nest, and relative location of the microlens features may affect the formation of bubbles in the microlenses.

The present invention has numerous advantageous effects over prior art developments. First, the central nest feature in the lower mold half allows the preform, such as a sphere, to rest in the proper location relative to the microlens cavities on the mold. Further, as the glass flows during the compression molding process, the glass expels gas from the mold cavities allowing the formation of lenses with accurate surface figure. Also, because only a single preform such as a sphere, oblate spheroid, or cylinder/fiber is required to mold many microlenses, this process is very efficient and cost effective. Additionally, this method allows for the molding of may types of microlenses including, but not limited to, piano-convex, plano-concave, convex-convex, concave-convex, concave-concave, and lenses with aspheric, anamorphic, and diffractive features as well as gratings and diffractive phase plates (Damman gratings).

For the purposes of this application optical elements such as lenses may be generally distinguished from microoptical elements such as microlenses in terms of diameter. Optical elements such as lenses as have a diameter of at least 1 mm while microoptical elements such as microlenses have a diameter of less than 1 mm. The method and apparatus of the present invention may be used to produce both optical elements and microoptical elements. Thus, as used herein, the term "optical elements" is intended to include any optical elements regardless of whether they have a diameter which is greater than or equal to 1 mm, or less than 1 mm.

DETAILED DESCRIPTION OF THE INVENTION

Figure 1:
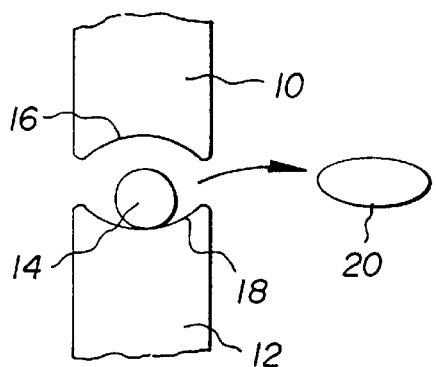
FIG. 1 is a side view schematic of a prior art molding apparatus for compression molding a convex-convex glass lens from a spherical preform.
Figure 2:
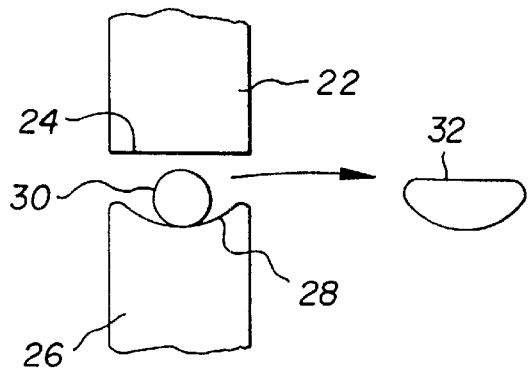
FIG. 2 is a side view schematic of a prior art molding apparatus for compression molding a convex-plano glass lens from a spherical preform.
Figure 3:
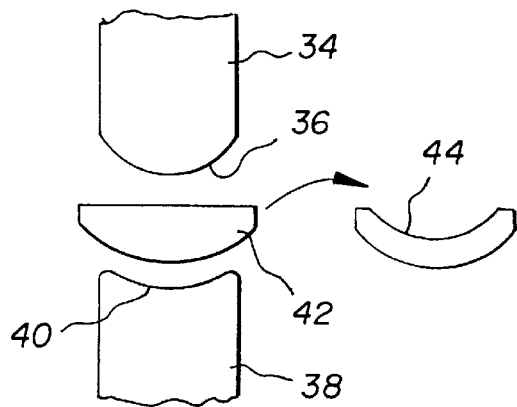
FIG. 3 is a side view schematic of a prior art molding apparatus for compression molding a concave-convex glass lens from a plano-positive preform.
Figure 4:
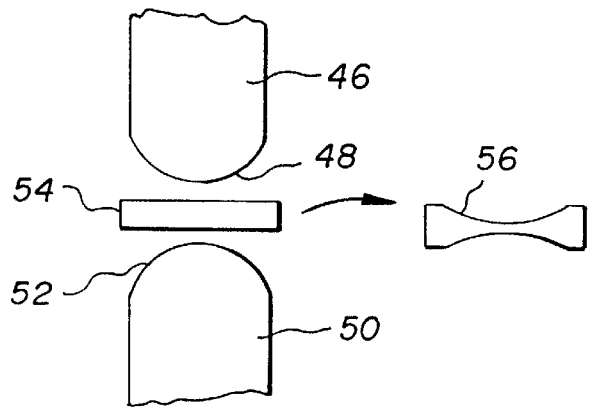
FIG. 4 is a side view schematic of a prior art molding apparatus for compression molding a concave-concave glass lens from a plano preform.
Figure 5:
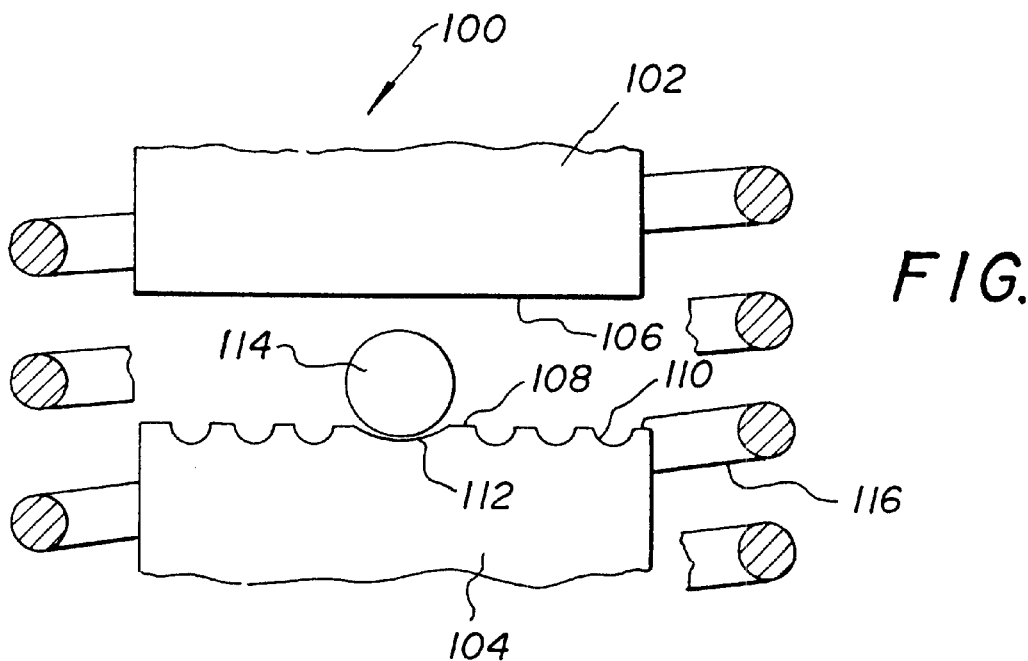
FIG. 5 is a side view schematic of the molding apparatus of the present invention for molding an array of glass microlenses from a spherical preform using a central nest.
Figure 7:
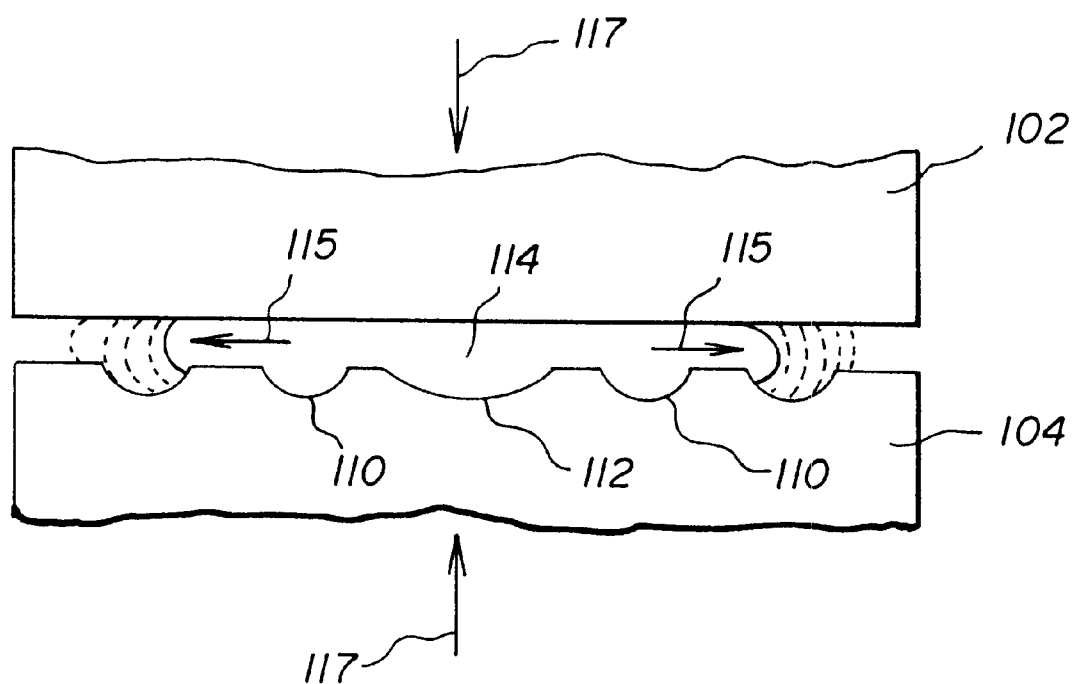
FIG. 7 is a side view schematic of the molding apparatus of the present invention showing the flow of glass from a central nest.
Figure 9:
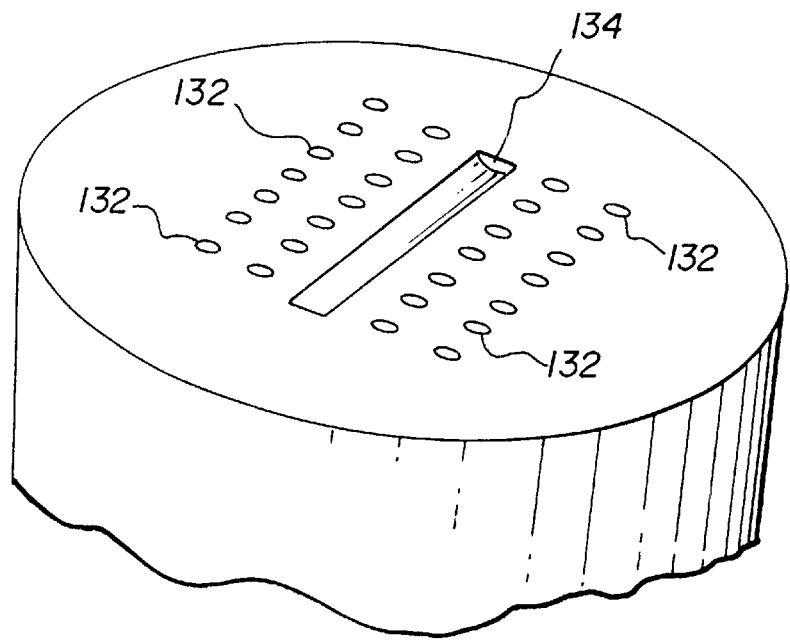
FIG. 9 is a perspective view of an alternative lower mold half from that depicted in FIG. 5 that allows an array of glass lenses to be molded from a glass rod or fiber; and, FIG. 10 is a perspective view of a microlens array molded with the alternative lower mold half depicted in FIG. 9 with the dashed lines representing exemplary singulation cutting paths.

Turning to FIG. 5 there is shown a cross-sectional schematic of the apparatus used to practice the method of the present invention. The apparatus 100 of the present invention includes an upper mold half 102 in the lower mold half 104. The upper mold half 102 includes an upper mold surface 106. Upper mold surface 106 is depicted as being plano but may include other optical geometries of such as concave or convex features. The lower mold half 104 includes mold surface 108 which has formed therein a plurality of lens or micro-lens cavities 110. The lens or micro-lens cavities 110 are spaced apart from a central nesting cavity 112 which provides residence for a preform 114 which is depicted as being spherical. Surrounding upper and lower mold halves 102 and 104 is induction heating coil 116. In operation, a preform 114 is placed in central nest cavity 112 and through actuation of induction heating coil 116, the temperature of the upper and lower more halves 102, 104 and preform 114 is raised to at least the glass transition temperature of the preform 114. Then the preform 114 is pressed between the upper and lower mold halves 102, 104 causing the preform 114 to deform and flow generally radially outward as depicted in FIG. 7. As the preform flows radially outward, it fills the lens or micro-lens cavities 110. Compression is performed to a positive stop at which point the mold halves 102, 104 and the preform 114 are allowed to cool to below the glass transition temperature and preferably to below the annealing point of the glass. In such manner, an integrally formed array 118 of lenses or micro-lenses 120 (see FIG. 9) is formed which can then be removed from the molding apparatus 10. It should be understood that upper and lower mold halves 102, 104 are not necessarily directly heated by induction. Rather, upper and lower mold halves 102, 104 preferably reside in a mold body (not shown) fabricated from a conductive material such as graphite or molybdenum. The mold body is heated by the induction field and the upper and lower mold halves 102, 104 are heated indirectly by conduction and radiant heat transfer.

Figure 6:
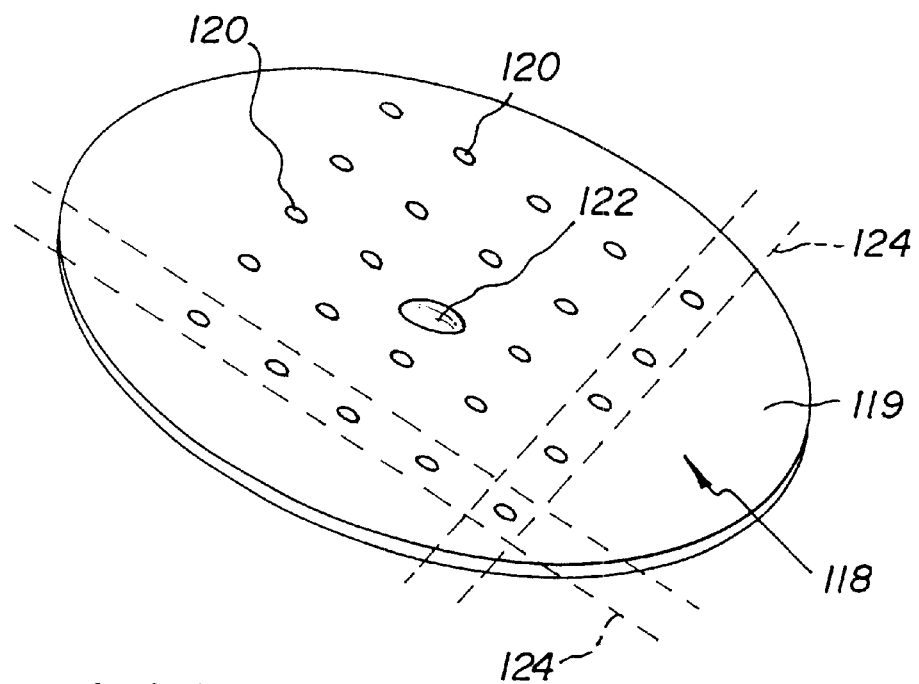
FIG. 6 is a perspective view of an exemplary glass microlens array molded using the molding apparatus of the present invention where the dashed lines show typical cutting paths for singulating a microlens.

Microlens arrays 118, such as shown in FIG. 6, for example, molded in accordance with the method of the present invention are free from surface figure distortion. Such a microlens array 118 includes a glass web 119 having microoptical elements such as microlenses 120 projecting therefrom. The central "bump" 122 created in the central cavity 112, however, is likely to have a gas void at the vertex. When the microlenses 120 are singulated from the array 118, the central "bump" 122 is discarded. Dashed lines 124 denote exemplary singulation cuts which may be made using a single or ganged blade dicing saw.

Central nest 112 is used to hold the preform 114 during molding. As shown in FIG. 7, by using a larger central "nest" or cavity 112 in the lower mold half 104 to hold the glass ball preform 114, it is possible to control the flow of the glass preform 114. The glass preform 114 flows generally radially outwardly as indicated by arrows 115 when mold halves 102, 104 compress preform 114 as indicated by arrows 117. In such manner, the glass flows into and across each microlens cavity 110 so that as the glass fills each microlens cavity 110 the air is expelled.

An experiment was conducted where an array 118 of four micro lenses 120 were molded using a mold with a central "nest" 112 to hold the preform 114 similar to the arrangement shown in FIG. 5. The upper mold half 102 had a flat (plano) mold surface 106. The lower mold half 104 contained the microlens cavities 110 and the central "nest" 112. This mold tool was constructed from an alloy of platinum with 5 weight percent gold. A layered coating consisting of a base layer of 750 Å of tantalum, an intermediate layer of 1500 Å of SiC, and a final layer of 1500 Å of hard carbon was applied to the surface of the tool to minimize thermal etching of the platinum alloy and to aid in release of the glass from the tool. The cavities 110 were formed in the mold half 104 using a spherical penetrator 1.5875 mm in diameter. An array 118 of microlenses 120 was molded from TaC4 glass (Hoya Optics) at a temperature of 735° C. in a nitrogen atmosphere. The starting glass ball preform 114 had a diameter of 2.16 mm. The preform 114 was placed in the central nest 112 and the mold halves 102, 104 were inductively heated. After suitable heating time, the mold halves 102, 104 were brought together compressing the glass preforms 15 into its final molded shape. As the glass preform 114 was compressed between the mold halves 102, 104, the glass flowed across the surface of the tool and flowed into each microlens cavity 110 expelling air as it filled the cavities 110. The lens array 118 had four spherical microlenses 120 (each being 440 μm in diameter by 31 μm vertex height) integrally molded to a glass web. The lenses 120 were located at 90° positions about the center of the tool and were radially located 1.5 mm from the center. The "bump" formed by the central nest was 1.4 mm in diameter by 419.5 μm deep. Microlenses 120 molded in such an array 118 were found to be free from voids due to trapped gasses. The central "bump" 122, however, did have a void due to trapped gas.

In a second experiment, an array 118 of eight microlenses 120 was molded using a lower mold half 104 with a central nest 112 to hold the preform 114 similar to the arrangement shown in FIG. 5. The lower mold half 104 contained the microlens cavities 110 as well as the central nest 112. The upper mold half 102 had a flat (plano) mold surface 106. The upper and lower mold halves 102, 104 were constructed from thoriated tungsten. A layered coating consisting of a base layer of 750 Å of tantalum, an intermediate layer of 1500 Å of SiC, and a final layer of 1500 Å of hard carbon was applied to the mold surfaces 106, 108 of the tool to minimize thermal etching of the tungsten and to aid in release of the glass from the tool. The microlens cavities 110 and the central nest 112 were formed in the lower mold half 104. For this particular mold half 104 a microimpression technique was used to create the microlens cavities 110 and the central nest 112. However, those skilled in the art will recognize that a variety of different techniques may be used to form the microlens cavities 110 and the central nest 12. For example, such cavities could be formed by diamond turning or reactive ion etching. An array 118 of eight microlenses 120 was molded from TaC4 glass (Hoya Optics) at a temperature of 720° C. (glass viscosity of $10^{6.63}$ P) in a nitrogen atmosphere. The starting glass ball preform 114 was 2.80 mm in diameter and was placed in the central nest 112 of the lower mold 104. The mold halves 102, 104 were inductively heated, and after suitable heating time to raise the temperature of the mold halves 102, 104 and the preform 114 to 720° C., the mold halves 102, 104 were brought together compressing the glass preform 114 into its final molded shape. As the glass was compressed between the mold halves 102, 104, the glass flowed across the surfaces 106, 108 of the tool and flowed into each microlens cavity 110 expelling air as it filled the cavities 110. The molded lens array 118 was comprised of a glass web 50 μm thick with eight radially located microlenses 45° apart and 3.5 mm from the center. The microlenses 120 were 240 μm in diameter with a vertex height of 60 um. In conducting this experiment, a force of 250 lbf and a viscosity of $10^{6.63}$ P was used to successfully mold an array 118.

The viscosity, molding force, compression rate, microlens mold geometry, location of the microlens cavities relative to the initial location of the perform, and the sag of the microlens mold will affect the propensity for void formation by stagnation, that is, the trapping of gas in individual cavities 110. Those skilled in the art will recognize that one or more of these factors can be varied to empirically arrive at a process configuration for a particular lens or microlens array design. One approach to determine the proper operating conditions for molding microlens arrays is to fabricate a special mold with an array of microlens cavities that vary in sag depth and radius of curvature. A design of experiments may then be conducted where glass viscosity, molding force, and molding time are varied. The data may then be tabulated to determine the limits for void-free molded microlenses. It is also possible to conduct partial filling studies (short shot) by molding intermediate arrays (interrupt the molding process before the mold halves are completely closed) in order to develop an understanding of filling patterns.

Figure 8:
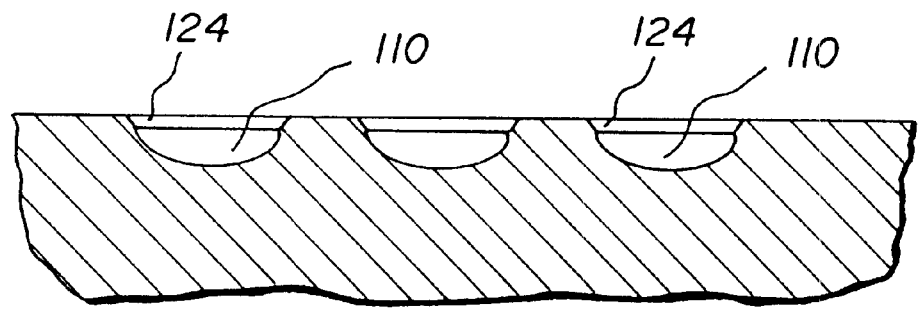
FIG. 8 is an enlarged cross section of the mold microlens cavities of the molding apparatus of the present invention including a circumferential chamfer or bevel around each microlens cavity and outside the clear aperture of the microlens to be formed therewith.

It should be understood that as the mold closes, the velocity of the glass web increases significantly as shown in Equation 1. If the glass flows too quickly or if the viscosity is too high, the glass will not completely expel gas from the microlens cavities. Equation 2 may be used to estimate the load and viscosity required to achieve specific mold compression rates.

$$\frac{dR(t)}{dt} = -\sqrt{\frac{V_{preform}}{4\pi}} [h(t)]^{\frac{-3}{2}} \frac{dh(t)}{dt} \quad (1)$$

$$\frac{dh(t)}{dt} = \frac{2h^3 W}{3\eta R^4} \quad (2)$$

Where $\frac{dR(t)}{t}$ = radial velocity of the glass front during molding $\frac{dh(t)}{dt}$ = compression rate $V_{preform}$=preform volume
h(t)=distance between mold halves as a function of time
W=molding force
R=radius of the mold
η=glass viscosity In separate experiments, it was discovered that a lead-in or chamfer 124 (see FIG. 8) around each microlens mold cavity 110 minimized void formation or moved the voids to locations away from the clear aperture of the lens. Another approach to minimize void formation is to conduct the molding process under a vacuum. Also, the use of ultrasonic vibration energy while compressing the mold halves together may help the glass flow into the cavities, minimizing the formation of voids from stagnation.

Figure 10:
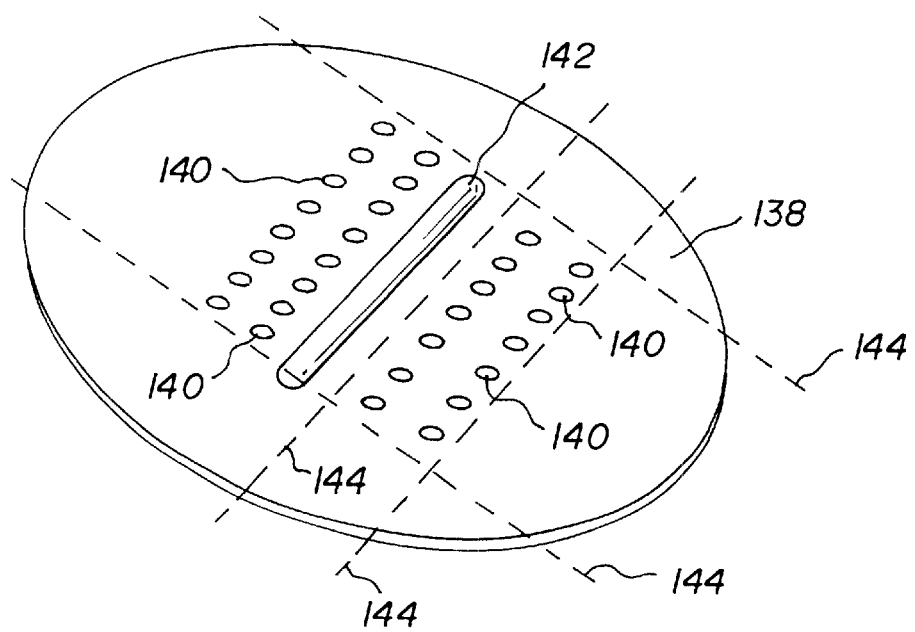

It is also believed that arrays of integrally formed microlenses can be molded using a lower mold half 130 (see FIG. 9) including microlens cavities (predetermined negative optical surface features) 132 and a central nest 134 wherein the central nest 134 is adapted to receive a cylindrical or fiber-shaped preform. An exemplary array 138 molded with this mold configuration is depicted in FIG. 10. Such exemplary array includes optical elements or lenses 140 which are positives of the predetermined negative optical surface features 132. The "bump" 142 formed in the central nest area is generally cylindrical in shape. Dashed lines 144 indicate representative cut lines for lens singulation.

For most combinations of the glasses and tool materials mentioned above and silicon carbide, some variant of a hard carbon coating is adequate for use as a release agent. A variety of carbon coating release agents are known in the prior art. The preferred method of carbon coating is the pyrolysis of simple hydrocarbon gases such as methane or acetylene. Additional methods are known in the prior art which are alleged to produce a diamond-like carbon. It is preferred to place the release agent on the tool rather than on the preform because the preform surface is remapped during the pressing operation. When the molding process is performed correctly, the curvature of the preform will always be greater than the curvature of the mold surface. In this way, the finished lens will always have a greater surface area then the surface of the preform from which it was made. It is also possible to coat both the preform and the tool with a carbon coating.

Although the glass preforms described herein have generally spherical or cylindrical geometries, those skilled in the art with recognize that other geometries may be useful depending on the final shape to be achieved for a particular lens or optical element.

Although the central nest feature is described herein as preferably being a depression in the mold surface, the critical function is that the preform be centered within an array of predetermined negative optical surface features. This central nesting could be similarly accomplished by providing a generally spherical preform including a small flat thereon allowing the preform to rest in a stable position on a flat central nest area of the lower mold surface. Other potential central nesting means include a gas jet that centers a spherical preform, or, small arms or guides that hold the preform until the mold halves engage the preform.

The heater described with reference to FIG. 5 is an induction-type heater. Heating could also be performed using other types of heaters such as, for example, radiant heaters, resistance heaters, infrared heaters, halogen heaters, etc.

From the foregoing it will be seen that this invention is one well adapted to attain all of the ends and objects hereinabove set forth together with other advantages which are apparent and which are inherent to the process.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. A method for forming an array of optical elements comprising the steps of:
   (a) forming a first mold half;
   (b) forming a second mold half with a plurality of predetermined negative optical surface features therein and a central nest area;
   (c) placing a glass preform in the central nest area;
   (d) heating the first and second mold halves and the glass preform to at least the glass transition temperature of the glass preform;
   (e) pressing the glass preform between the first and second mold halves to thereby form an integral array of optical elements, each of the optical elements being a positive of the predetermined negative optical surface features;
   (f) cooling the integral array of optical elements to below the glass transition temperature; and
   (g) removing the integral array of optical elements from the first and second mold halves.

2. A method for forming an array of optical elements comprising the steps of:
   (a) supporting a glass preform in a central nest area of a lower mold half and beneath an upper mold half, the lower mold half having a plurality of predetermined negative optical surface features therein;
   (b) heating the first and second mold halves and the glass preform to at least the glass transition temperature of the glass preform;
   (c) pressing the glass preform between the first and second mold halves to thereby form an integral array of optical elements, each of the optical elements being a positive of the predetermined negative optical surface features;
   (d) cooling the integral array of optical elements to below the glass transition temperature; and
   (e) removing the integral array of optical elements from the first and second mold halves.

3. A method as recited in claim 2 further comprising the step of:
   singulating the integral array of optical elements into a plurality individual optical elements.

4. A method as recited in claim 1 further comprising the step of:
   cutting the integral array of optical elements into a plurality individual optical elements.

5. An apparatus for forming an array of optical elements comprising:
   (a) a first mold half;
   (b) a second mold half with a plurality of predetermined negative optical surface features therein and a central nest area;
   (c) a glass preform supported in the central nest area;
   (d) a heater for heating the first and second mold halves and the glass preform to at least the glass transition temperature of the glass preform; and
   (e) means for compressing the glass preform between the first and second mold halves.

6. An apparatus for forming an array of optical elements compromising:
   (a) a first mold half including a first mold surface;
   (b) a second mold half including a second mold surface having a plurality of predetermined negative optical surface features therein;
   (c) a central nest area in said second mold surface for supporting a glass preform therein; and
   (d) a heat source surrounding said first and second mold halves and the glass perform residing in said central nest area.

7. An apparatus as recited in claim 6 wherein:
   said central nest area is a circular cavity.

8. An apparatus as recited in claim 6 wherein:
   said central nest area is a cavity.

9. An apparatus as recited in claim 6 wherein:
   said central nest area is shaped to receive a cylindrical glass preform.

10. An apparatus as recited in claim 6 wherein:
    said central nest area is shaped to receive a spherical glass preform.

11. An apparatus as recited in claim 5 wherein:
    said central nest area is a circular cavity.

12. An apparatus as recited in claim 5 wherein:
    said central nest area is a cavity.

13. An apparatus as recited in claim 5 wherein:
    said central nest area is shaped to receive a cylindrical glass preform.

14. An apparatus as recited in claim 5 wherein:
    said central nest area is shaped to receive a spherical glass preform.

* * * * *